(12) United States Patent
Mathias

(10) Patent No.: US 7,305,420 B2
(45) Date of Patent: Dec. 4, 2007

(54) SYNCHRONIZING MODIFIABLE DOCUMENTS WITH MULTIPLE CLIENTS USING DOCUMENT SUBSECTIONS

(75) Inventor: Razvan Mathias, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 11/136,976

(22) Filed: May 25, 2005

(65) Prior Publication Data

US 2006/0271603 A1    Nov. 30, 2006

(51) Int. Cl.
*G06F 12/00* (2006.01)
*G06F 17/30* (2006.01)
*G06F 15/00* (2006.01)

(52) U.S. Cl. .................. 707/201; 707/203; 715/500.1; 715/511; 715/521

(58) Field of Classification Search ................ 707/201, 707/203; 715/500.1, 511, 521
See application file for complete search history.

(56) References Cited

U.S. PATENT DOCUMENTS

| 6,993,476 | B1* | 1/2006 | Dutta et al. | 704/9 |
| 7,047,248 | B1* | 5/2006 | Tycast | 707/102 |
| 2003/0172113 | A1* | 9/2003 | Cameron et al. | 709/204 |
| 2004/0073541 | A1* | 4/2004 | Lindblad et al. | 707/3 |
| 2004/0243921 | A1* | 12/2004 | Carr et al. | 715/500 |

OTHER PUBLICATIONS

APPLE, *Sync music, podcasts and photos to go*, http://www.apple.com/itunes/sync.html, Jul. 20, 2005, 2 pp, Apple Computer, Inc., United States.

BLACKBERRY, *Corporate Data Access*, http://www.blackberry.com/products/service/cda.shtml, Jul. 22, 2005, 2 pp, Research In Motion, Ltd.

Good Technology, Inc., GoodAccess™, http://www.good.com/index.php/products_good_access.html, Jul. 22, 2005, 2 pp., Good Technology, Inc., United States.

Good Technology, Inc., GoodLink™ Wireless Messaging, http://www.good.com/index.php/products_wireless_email.html, Jul. 22, 2005, 2 pp., Good Technology, Inc., United States.

MICROSOFT, *About Devices*, http://msdn.microsoft.com/library/default.asp?url=/library/en-us/wmplay10/mmp_sdk/aboutdevices.asp, Jul. 20, 2005, 1 pg., Microsoft Corporation, United States.

MICROSOFT, *About Partnerships*, http://msdn.microsoft.com/library/default.asp?url=/library/en-us/wmplay10/mmp_sdk/aboutpartnerships.asp, Jul. 20, 2005, 1 pg., Microsoft Corporation, United States.

(Continued)

*Primary Examiner*—Jean M. Corrielus
*Assistant Examiner*—Christopher P Nofal
(74) *Attorney, Agent, or Firm*—Senniger Powers

(57) ABSTRACT

Methods, systems, and computer-readable media for synchronizing and sharing of relatively large, modifiable documents with multiple clients utilizing a variety of devices. The method receives instructions from one or more clients regarding a preferable format for use with a respective client device. The method further defines subsections of the shared document based upon semantic breaks within the original document and generates a subsection ID for each subsection. The subsection IDs are sent to the clients who can review the IDs and request to receive one or more subsections on their respective device. The requested subsections are transcoded for use on the respective client devices and sent to the client according to their requests. The clients may then modify the one or more subsections and these modifications are applied to corresponding subsections on other client devices.

17 Claims, 7 Drawing Sheets

OTHER PUBLICATIONS

MICROSOFT, *About the Synchronization Engine*, http://msdn.microsoft.com/library/default.asp?url=/library/en-us/wmplay10/mmp_sdk/aboutdevicesynchronization.asp, Jul. 20, 2005, 1 pg., Microsoft Corporation, United States.

MICROSOFT, *About Playlist Synchronization*, http://msdn.microsoft.com/library/default.asp?url=/library/en-us/wmplay10/mmp_sdk/aboutplaylistsynchronization.asp, Jul. 20, 2005, 2 pp., Microsoft Corporation, United States.

* cited by examiner

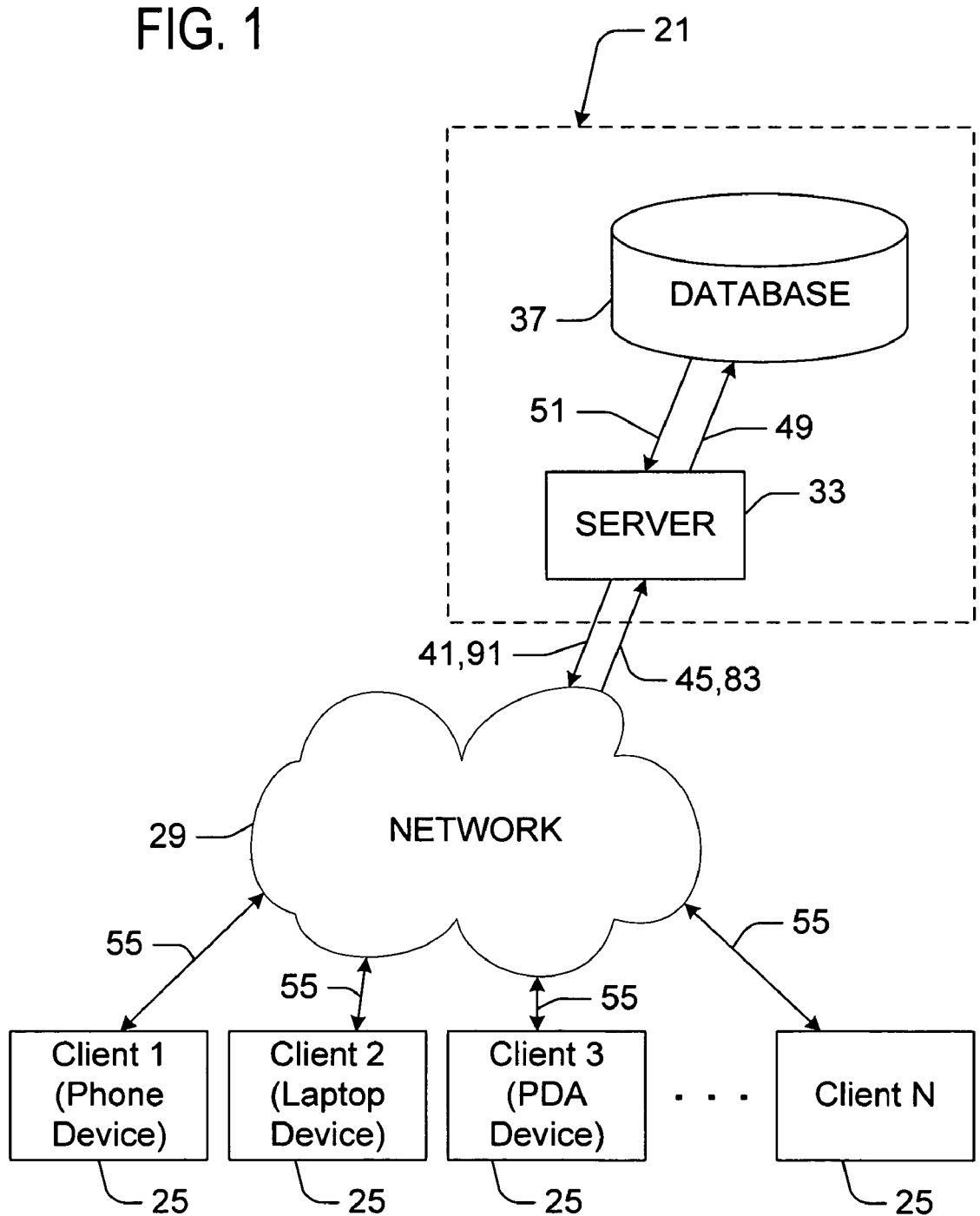

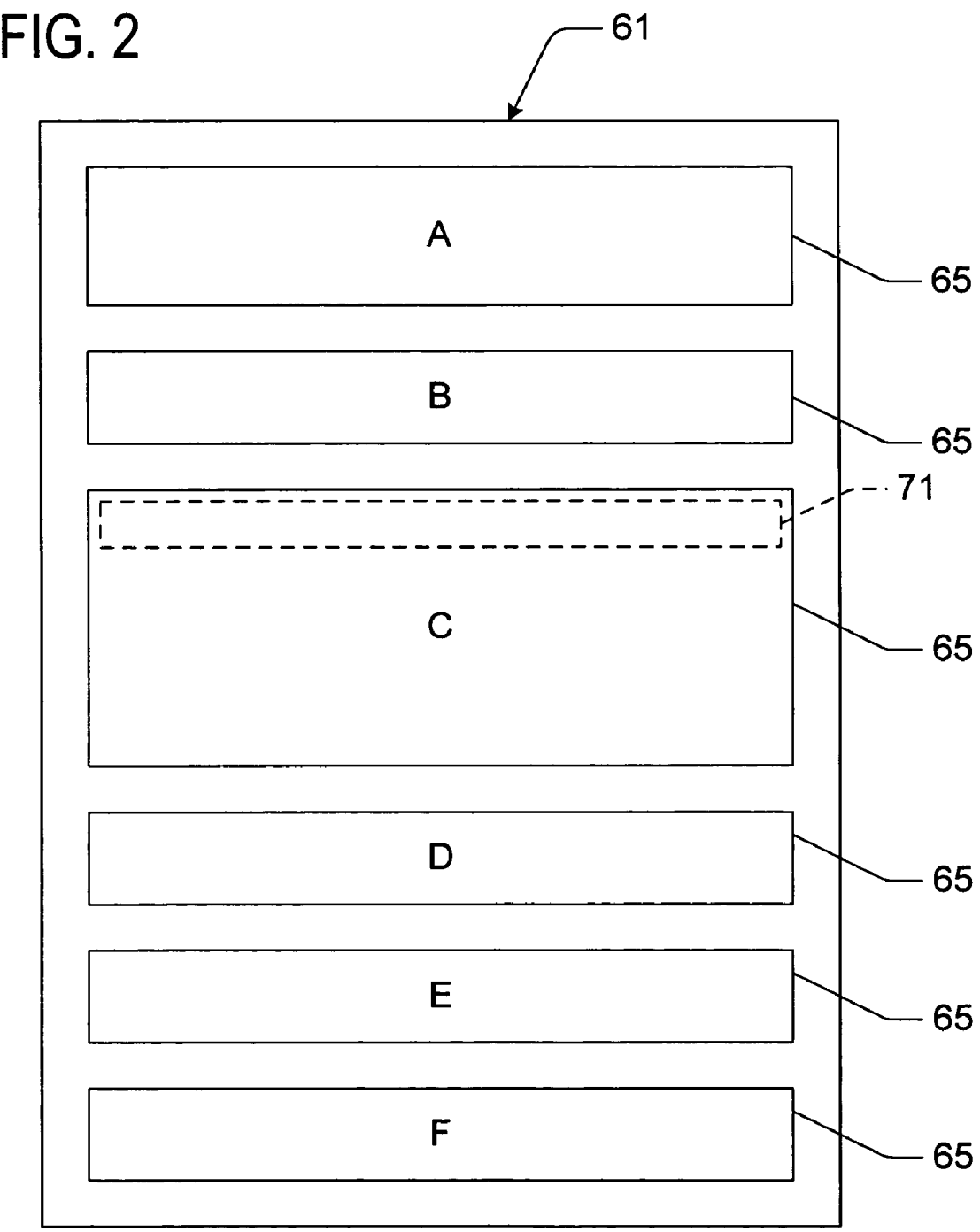

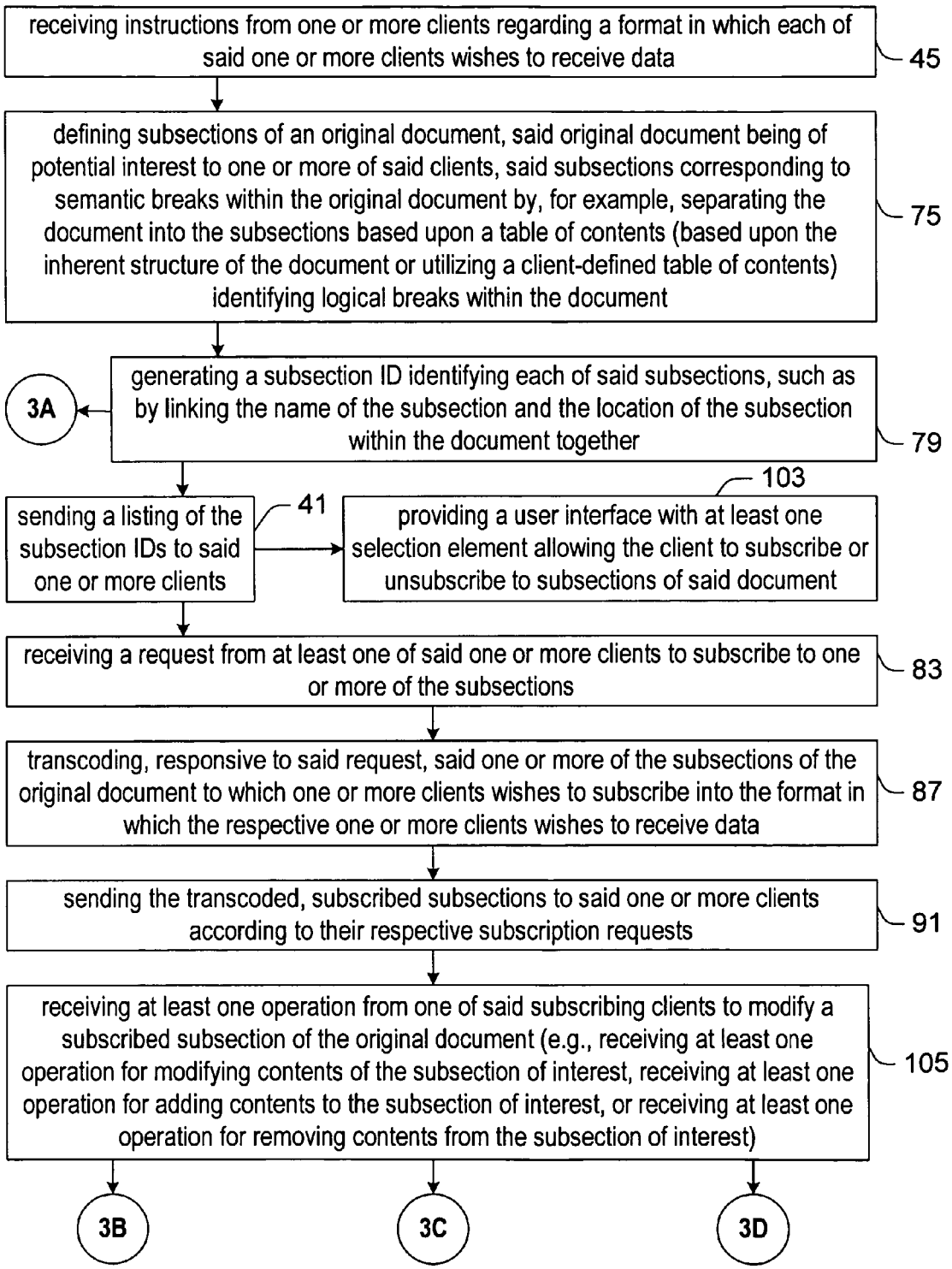

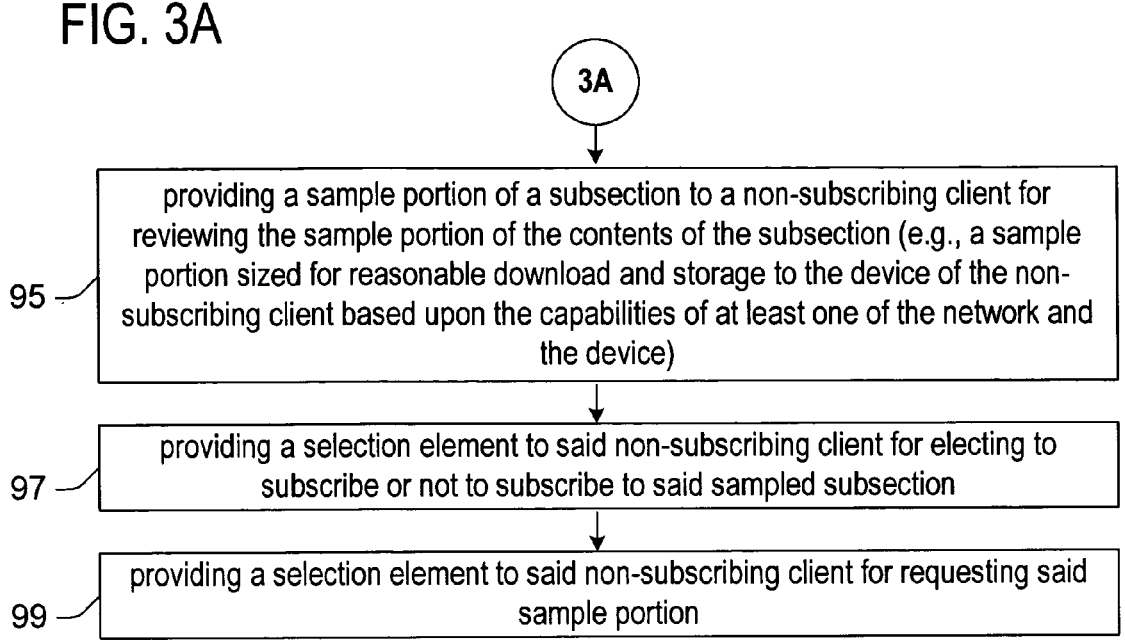
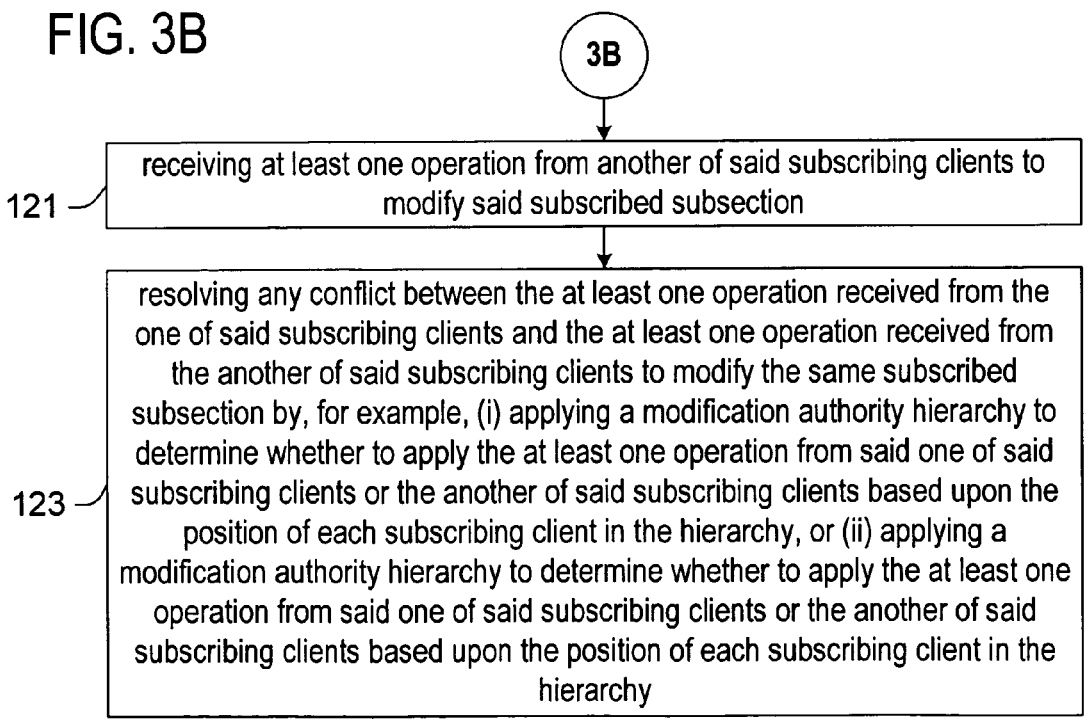

SYNCHRONIZING MODIFIABLE DOCUMENTS WITH MULTIPLE CLIENTS USING DOCUMENT SUBSECTIONS

TECHNICAL FIELD

Embodiments of the present invention relate to the field of synchronizing and updating documents accessible and modifiable by multiple clients on a variety of devices via a network. In particular, embodiments of this invention relate to methods, computer-readable media, and data structures capable of synchronizing relatively large documents among multiple clients on a piecemeal, on-demand basis, whereby only portions of documents of interest to each particular client are provided to speed communication and minimize file storage requirements.

BACKGROUND OF THE INVENTION

Many organizations make use of relatively large, shared documents stored in various formats, such as HTML (Hypertext Markup Language), Microsoft Word, PDF (Portable Document Format), and text, among others. For example, such large documents may include shared legal documents held by law firms or shared engineering documents held by engineering firms or corporations. Three important qualities of such documents discourage their use on conventional devices: (1) the documents can become quite large, (2) the documents are frequently modified, and (3) the documents may not be in a format that can be read and displayed by the particular device (including mobile devices) utilized be each client. In particular, many mobile devices today lag behind desktop devices in at least three areas: connectivity, storage, and functionality. For example, GPRS (General Packet Radio Service) communication exhibits a low-bandwidth, high-latency connection. Moreover, a typical low-end, conventional, mobile device may have about 32 MB of memory, which severely limits the size of documents that may be stored. Also, code or programs for accessing and viewing documents on many devices are non-existent. Moreover, some formats may render better than others due to user interface scaling issues. In addition, some document formats may utilize less memory to expand than others. All of these issues cooperate to discourage the widespread use of relatively large documents collaboratively on different, particularly mobile, devices.

Another issue with downloading, viewing, editing, and uploading relatively large documents on devices is the time required to download such a document. As an example, if a relatively large document is already downloaded on a device and only a small modification in the document is required, downloading the entire document can waste scarce resources of bandwidth, memory, time, and money (e.g., where a network charges by the amount of data transferred).

Conventional systems attempt to address these problems with file synchronization systems and methods. Conventional file synchronization solutions require that the entire document be replicated to a device. Although some PC-based applications go a step further to transcode the document into a format that the device can read, the problems with both of these conventional solutions are still numerous. For example, the wholesale synchronization of entire documents requires that all of the devices be able to store the entire contents of the document in limited amounts of memory, as discussed above. Moreover, modifying a small portion of the document will cause the entire document to be downloaded to the device. Because of the conventional low-bandwidth and high-latency characteristics of wireless networks (e.g. GPRS) and the conventional cost structure of paying per byte of transferred data, it becomes expensive (both monetarily and temporally) to download an entire document to a device. In another conventional example, individual pages of a lengthy document may be downloaded one-by-one to reduce the amount of data transferred at one time. This solution, however, is only applicable to streamable files (e.g., html files) and does not lend itself too well to editing by the client receiving the pages, often due to the differences between client devices and programs. Moreover, this process allows only for download of information, and does not provide for editing and uploading of client modifications. Another conventional system synchronizes data offline, to avoid the problems associated with an unreliable connection. This solution, however, fails to address the issues of inadequate storage and transfer time, which may still be a problem with offline synching because of large document sizes.

Unfortunately, these issues are not addressed by any conventional system. Accordingly, a solution that improves synchronization of large documents among multiple clients is desirable.

SUMMARY OF THE INVENTION

Accordingly, a method (or a computer-readable media or a data structure) for synchronizing relatively large documents among multiple clients on a piecemeal, on-demand basis whereby only portions of documents of interest are sent to each particular client is desired to address one or more of these and other disadvantages. Advantageously, at least one embodiment of the present invention individually transcodes each portion of the document into a format understood by a particular mobile device. In addition, rather than downloading an entire modified subsection each time a change is made, at least one embodiment of the invention downloads instructions for modifying only those modified portions of the document to which the client subscribes. Generally, aspects of the invention permit synchronizing of documents with multiple clients by receiving instructions from one or more clients regarding preferred data format, defining subsections of an original document, generating a subsection ID identifying each of the subsections, sending a listing of the subsection IDs to the one or more clients, receiving a request from at least one of the one or more clients to subscribe to one or more of the subsections, transcoding, responsive to the request, the one or more of the subsections into the preferred format of each client, and sending the transcoded, subscribed subsections according to respective client subscription requests. For example, embodiments of the invention may be well-suited for collaboration by a group of clients, each utilizing separate devices, on one large, shared document.

In one aspect of the invention, a method for synchronizing documents with multiple clients is disclosed. The method comprises receiving instructions from one or more clients regarding a format in which each of the one or more clients wishes to receive data. The method further defines subsections of an original document of potential interest to one or more of the clients. The subsections correspond to semantic breaks within the original document. The method further comprises generating a subsection ID identifying each of the subsections and sending a listing of the subsection IDs to the one or more clients. The method further receives a request from at least one of the one or more clients to subscribe to one or more of the subsections and transcodes, responsive to the request, the one or more of the subsections of the original document to which one or more clients wishes to subscribe into the format in which the respective one or more clients wishes to receive data. The method also sends the transcoded, subscribed subsections to the one or more clients according to their respective subscription requests.

In another aspect of the invention, a system for synchronizing documents with multiple clients adapted for connection with the system via a network comprises a server and a database. The system is further adapted for connection with the network and adapted for receiving instructions from one or more of the clients regarding the format in which each of the one or more clients wishes to receive data from the server via the network. The system further comprises a database adapted for connection with the server for storing an original document of potential interest to one or more of the clients. The server is further configured to define subsections of the original document stored on the database. The defined subsections correspond to semantic breaks within the original document. The system further generates a subsection ID identifying each of the subsections and sends a listing of the subsection IDs to each of the one or more clients via the network. The system further receives a request from at least one of the one or more clients to subscribe to one or more of the subsections via the network. The system also transcodes, in response to the received request, the one or more of the subsections of the original document to which one or more clients wishes to subscribe and sends the transcoded subscribed subsections to the one or more clients according to their respective subscription requests.

In still another aspect of the invention, a computer-readable medium with computer executable instructions for receiving, defining, generating, sending, receiving, transcoding, and sending generally as set forth above with respect to the method and system of the present invention are disclosed.

Alternatively, the invention may comprise various other methods, computer-readable media, systems, and data structures.

Other features will be in part apparent and in part pointed out hereinafter.

BRIEF DESCRIPTION OF THE DRAWINGS

FIG. 1 is a diagram of a system of the present invention;

FIG. 2 is a diagram of a document with multiple subsections according to the present invention;

Corresponding reference characters indicate corresponding parts throughout the drawings.

DETAILED DESCRIPTION OF THE INVENTION

Figure 3C:
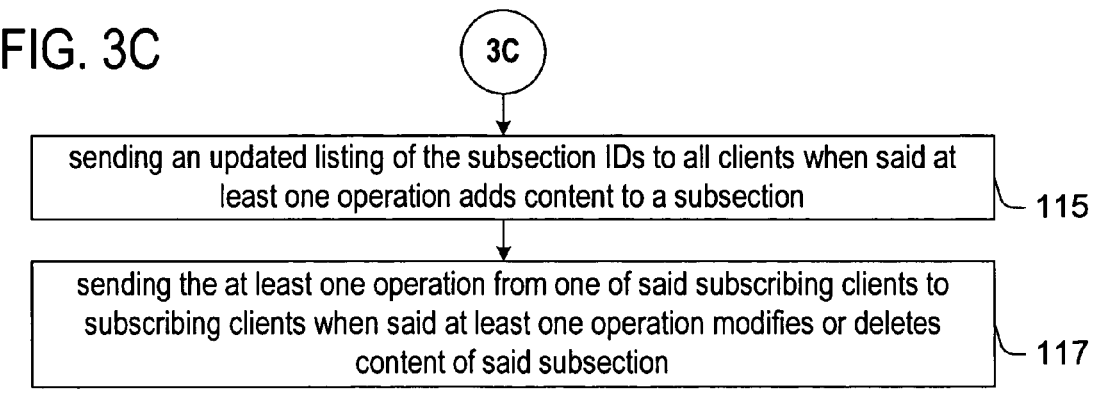
FIGS. 3-3D are flowcharts of methods of the present invention.

Referring now to FIG. 1, a diagram depicting a system, generally indicated at 21, of the present invention for synchronizing documents with multiple clients 25 adapted for connection with the system via a network 29 is shown. The details of this system 21 are discussed in detail herein, and will be referred to throughout the following discussion. The system 21 generally comprises a server 33 and a database 37. The server 33 in the illustrated embodiment is adapted for connection with the network 29 for sending instructions at 41 to clients 25 via the network and for receiving instructions at 45 from one or more of the clients via the network. The database 37 is adapted for connection with the server 33 for storing an original document of potential interest to one or more of the clients 25. Moreover, the server 33 can send instructions at 49 to the database 37 and receive instructions at 51 from the database. Each of the clients 25 is configured to communicate directly at 55 with the network 29, including sending communications to the network and receiving communications from the network. The server 33 and database 37 of the system 21 are also configured to provide the functionality discussed below in association with the multiple methods of the present invention.

Method of Synchronizing Documents with Multiple Clients

Figure 3D:
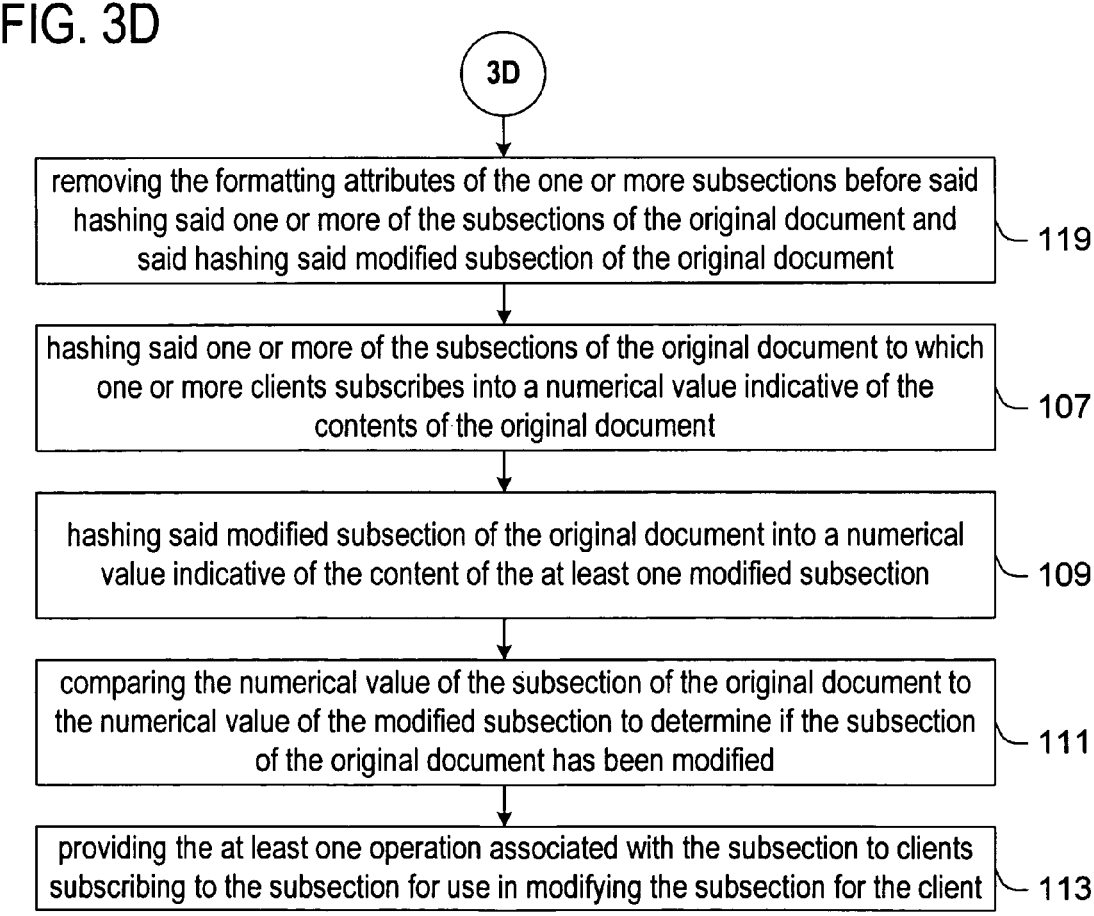

Referring to FIGS. 1 and 3-3D, a method for synchronizing documents with multiple clients 25 is disclosed and will be described with reference to the system 21 described immediately above and the flowcharts of FIGS. 3-3D. As used herein, a client, or user, 21 communicating via a device may be any number of entities, representing individuals, groups of individuals, or automated devices functioning under the control of one or more individuals, among others. The term device, computer, or computing device as used herein may comprise a variety of different devices, including but not limited to a personal computer, a laptop computer, or a handheld computers, as well as cellular phones, personal digital assistants, and other portable media devices, among others. Other devices or means for accessing documents not specifically mentioned here are also contemplated as within the scope of the present invention.

According to the present method, the server 33 may receive instructions, at 45, from one or more clients 25 regarding a format in which each of the one or more clients wishes to receive data (see FIG. 3). In one example, this formatting selection may occur early in the process to ensure that all communications with the device are in an understandable format, although it is contemplated that such a selection may occur at a later time in the process. Each client can request any number of different formats, including html formatting, formatted text documents (e.g., Microsoft Word documents, rich text format documents, Portable Document Format (PDF), etc.), ASCII text formatting, among others. The system 21 and method of the present invention may utilize these formatting instructions when transcoding data for sending at 41 to each client 25 to ensure that the data sent will be accessible by each of the clients.

Referring now to FIG. 2, a diagram of a document of potential interest to one or more clients 25 is generally indicated at 61. Multiple clients 25 sharing and collaborating with a common document will benefit from the systems and methods of the present invention. In particular, clients 25 sharing particularly large documents will stand to gain substantial functionality by utilizing the system and methods of the present invention. Assuming document 61 in FIG. 2 is such a relatively large document, the method of the present invention further defines, at 75, subsections A-F, each indicated 65, of the original document (see FIG. 3). These subsections 65 correspond to semantic, or logical, breaks within the original document 61. In one example, the subsections 65 may be established according to a table of contents associated with the original document 61. By utilizing a table of contents or other logical organizational scheme of the document 61 to establish the subsections, the present invention may divide the document into logical subsections that will make sense to the clients 25. Moreover, the subsections 65 will be more likely to begin and end at logical locations within the document. This particular scheme is much more intuitive and helpful than conventional methods, which may divide documents based upon an end of a page of text, the number of words in each subsection, the memory allocation of each subsection, or other arbitrary measure.

In one example, defining, at 75, the subsections 65 of the original document 61 comprises separating the document, also at 75, into the subsections based upon a table of contents associated with the document identifying logical breaks within the document (see FIG. 3). Utilizing such a table of contents helps ensure that appropriate subsections 65 are defined because the table of contents already has been logically created by the drafter of the document 61 according to the contents of the document. In one example, such a table of contents may be client-defined. Where no table of contents is present, the subsections 65 of the original document 61 may be defined by generating a table of contents based upon the inherent structure of the document itself. For example, automatic generation of a table of contents can occur in any number of ways, including leveraging an outline view of a Microsoft Word document, utilizing headings and subheadings included in a document, and utilizing white space recognition in the document. Other methods for automatically establishing a table of contents are also contemplated as within the scope of the claimed invention.

The present method also contemplates generating a subsection ID, at 79, identifying each of the subsections 65 (see FIG. 3). These subsection IDs may be structured in any number of logical ways for easy review and consideration by clients. In one example, generating a subsection ID may comprise linking, also at 79, the name of the subsection 65 and the location of the subsection within the document together. In this manner, both the general contents of the subsection 65 and its relative location with respect to other subsections is readily known simply by reviewing the subsection ID. For the subsections 65 of FIG. 2, for example, the subsection IDs may be as simple as 1A, 2B, 3C, 4D, 5E, and 6F, wherein the numerical portion of the subsection ID indicated the location of the subsection within the document 61 and the letters A-F indicate the topic discussed in the subsection. In the exemplary embodiment of FIG. 2, the letters A-F can be readily substituted with topical headings indicative of the contents of the subsection (e.g., 1Apples, 2Bananas, etc.). As would be readily contemplated by one skilled in the art, other methods of identifying such subsection IDs may also be used without departing from the scope of the claimed invention.

Once the subsection IDs are determined, the server 33 sends a listing of the subsection IDs, at 41, to the one or more clients 25 via the network 29 so that the clients can review the subsection IDs and determine to which subsections they wish to subscribe (see FIGS. 1 and 3). In this manner, the clients 25 can quickly peruse the subsection IDs of the document 61, and thus a summary of their content, to determine if they would like to subscribe to any of the subsections 65, without having to download the entire document, or even a portion of the document before reviewing the subsection IDs.

Each client 25 has the option of sending a request at 55 via the network 29 to subscribe to one or more of the subsections 65. The server 33 receives such a request, at 83, from at least one of the one or more clients 25 to subscribe to one or more of the subsections 65 (see FIG. 3). The server 33 may receive a different subscription request from each client 25, allowing each client to customize her view of the document 61 on her device. For example, as shown in FIGS. 1 and 2, the server 33 may receive a request at 45 from Client 1 to receive subsection A, while Client 2 elects to receive subsections A, C, and F, while Client 3 selects to receive only subsection F. In this example, rather than having to send the entire document to each client 25, the system 21 may simply send the subsection or subsections 65 to the respective client making the request.

Before sending data to one or more of the clients at 41, the server 33 further transcodes, at 87, in response to the client request(s) the one or more of the subsections 65 of the original document 61 to which one or more clients 25 wishes to subscribe into the format in which the respective one or more clients wishes to receive data (see FIG. 3). In the example discussed above, each of the subscribed subsections 65 may be transcoded for access and modification according to the particular formatting requirements of each of the clients 25. As used herein, a transcoded item is as an item that is formatted or configured so that it may be accessed, viewed, modified, and/or otherwise utilized on different platforms, irrespective of the application utilized, the language used, the viewing device employed, or the communication protocol required. By utilizing transcoded documents, or providing transcoded views, several different clients 25 are capable of viewing the same document 61 or file on different devices, utilizing different programs, screens, protocols, etc. This enables collaboration by a group of clients 25, each utilizing separate devices, on one large, shared document 61. It should be noted here that the transcoding may alternately occur at the client 25.

Once transcoded, the server 33 may send, at 91, the transcoded, subscribed subsections 65 to the one or more clients 25 according to their respective subscription requests (see FIG. 3). The clients 25 may then view the contents of the subsections 65 to which they have subscribed. In one example, the server 33 sends only the subsections subscribed to by a particular client 25. In this example, the server 33 will not send a client a subsection to which the client does not subscribe. Each client may individually alter her subscriptions at any time, adding subsections, removing subsections, or modifying subsections, as will be discussed in greater detail below.

Subsection Sampling

In another example, a method embodying aspects of the present invention may further provide, at 95, a sample portion 71 of a subsection 65 to a non-subscribing client 25 for reviewing the sample portion of the contents of the subsection (see FIG. 3A). In some instances, the subsection ID alone may not provide adequate information to each non-subscribing client 25 considering subscribing to a subsection 65 of a document 61. The system 21 may additionally offer a sample portion 71 of one or more subsections 65 for review to the client. In one example, the system 21 additionally provides, at 97, a selection element to the non-subscribing client 25 for requesting the sample portion 71 of one or more of the subsections 65 (see FIG. 3A). In another example, the system 21 automatically provides the sample portion 71 with one, some, or all of the subsections 65. Where a sample portion 71 is included with the subsection ID, the system 21 may also provide, at 99, a selection element to the non-subscribing client for electing to subscribe to or not to subscribe to the sampled subsection 65. Other features help preserve the relative ease of use of the present method by minimizing the amount of data downloaded to or uploaded from any particular client 25. In particular, the providing a sample portion 71 of a subsection 65 may further comprise providing, also at 95, a sample portion sized for reasonable download and storage to the device of the non-subscribing client 25 based upon the capabilities of at least one of the network and the device. One skilled in the art would readily understand how to select a correctly-sized sample portion 71 that will not negatively impact the overarching benefits of the present invention, namely, judiciously utilizing the bandwidth and memory of client devices and networks to nearly the minimum amount required to satisfy the demands of a particular client 25.

Selection elements are provided generally herein to allow clients 25 to interact with the server 33 of the system 21 according to the present methods. In one example, the server 33 provides such functionality by providing, at 103, a user interface for interaction with the client 25 incorporated on the client's device (see FIG. 3). Such a user interface may, for example, include at least one selection element allowing the client to subscribe or unsubscribe to subsections 65 of the document 61. As discussed herein, other selection elements may also be provided to each client 65 via the user interface.

Client Modification of the Subsections

Upon review of a particular subsection 65, a client 25 may utilize an application on her device to make one or more modifications to the subsection. These modifications may do any number of things, including adding text, deleting text, modifying text, rearranging text, to name a few. In particular, the server 33 receives, at 105, at least one operation at 45 from one of the subscribing clients 25 comprising instructions to modify the contents of the subsection 65 of interest, add contents to the subsection of interest, or remove contents from the subsection of interest (see FIG. 3). A combination of one or more of these operations may also be received by the server 33 according to the present method. Such modifications may be sent to the server 33 either automatically or as specifically directed by a client 25. It is important to note here that the entire modified subsection 65 need not be sent to the server 33, but rather only the operations initiated by one of the subscribing clients 25 upon the subsection. For example, if the client 25 were to remove all references to a first text string (e.g., "World Wide Web") and replace them with a second text string (e.g., "WWW"), only the relatively simple operation of replacing the first string with the second string would need to be forwarded to the server 33 for application to the subsection 65 for each of the subscribers. By sending and receiving only operations, rather than the entire modified subsection, much less data is transferred, thereby reducing memory requirements and increasing the speed at which the updates are received by the server 33 and sent back to the subscribing clients 25.

Referring now to FIG. 3D, aspects of the invention further permit checking the synchronization. Periodically, or in response to information received by the server 33 indicating that a particular subsection 65 may have been modified by a client 25, the server of the present system 21 may compare the subsection stored in the database 37 with one, some, or all of the subsections stored on client devices. In one example, the system 21 hashes, at 107, the subsection(s) 65 of interest of the original document 61 to which one or more clients 25 subscribe into a numerical value indicative of the contents of the subsection of the original document (see FIG. 3D). The system 21 then hashes, at 109, the modified subsection 65 of the original document 61 into a numerical value indicative of the content of the at least one modified subsection. With these two hash values, the system 21 may then compare, at 111, the numerical value of the subsection 65 of the original document 61 to the numerical value of the modified subsection to determine if the subsection of the original document has been modified (see FIG. 3D). Once a modification, which may also be simply an addition or a deletion of data, is detected, the system 21 provides, at 113, the operation(s) associated with the modified subsection 65 to clients 25 subscribing to the subsection for use in modifying the subsection for each client. After such a modification, each client 25 has an identical copy of the modified subsection, thereby allowing ready review and access to the latest changes in the document 61. In one example, the server 33 sends, at 115, an updated listing of the subsection IDs to all clients when the operation(s) adds content to a subsection 65 (see FIG. 3C). This action provides subscribers with information relating to a subsection 65 to which they have demonstrated a particular interest and non-subscribers with an opportunity to subscribe to the subsection if the added content may be of particular interest.

In another example where the operation(s) only modifies or deletes content of the subsection 65, the server 33 sends, at 117, the operation(s) from one of the subscribing clients 25 to all the subscribing clients (see FIG. 3C). In this example, the subscribers have demonstrated a desire to maintain an updated version of the subsection 65 on their device. The server does not send these modification or deletion operations to the non-subscribing clients 25, however, because the removal or modification of information within the subsection 65 will not likely be of interest to a non-subscriber.

In another example, the system 21 may remove, at 119, the formatting attributes of the one or more subsections 65 before hashing the one or more of the subsections of the original document 61 and before the hashing of the modified subsection of the original document (see FIG. 3D). This ensures that formatting changes that may have occurred to the subsection 65 on a client device do not create a false positive for a changed document subsection when comparing the hashing of the original subsection and the potentially modified subsection.

In addition to sending the modifications to the subscribing clients 25, the system also sends a notification of the modified subsection 65 to clients not subscribing to the modified subsection. In one example, sending notification of the modified subsection 65 to clients 25 not subscribing to the modified subsection comprises updating, at 115, the listing of the subsection IDs to indicate the modified subsection (see FIG. 3C). In this manner, the non-subscribing client 25 may simply review the updated list of subsection IDs to determine if any subsections have changed, again, without downloading each subsection.

In yet another example, two or more clients 25 may attempt to modify the same document subsection 65, requiring that the system 21 employ a conflict resolution methodology. In such a case, the server 33 may receive, 121, at least one operation from two or more of the subscribing clients 25 (e.g., Client 1 and Client 2) to modify the same subscribed subsection (see FIG. 3B). The server 33 resolves, at 123, any conflict between the operation(s) received from one of the subscribing clients 25 and the operation(s) received from another of the subscribing clients to modify the same subscribed subsection 65 by employing the conflict resolution methodology. In one example, the server 33 applies a modification authority hierarchy to determine whether to apply the at least one operation from Client 1 or Client 2 based upon the position of each subscribing client 25 in the hierarchy. For instance, where Client 2 is ranked above Client 1 in the modification authority hierarchy, the modifications of Client 2 will be utilized, instead of the modifications of Client 1. In another example, the server 33 resolves any conflict by utilizing the received operation that satisfies a temporal requirement based upon the time each of the operations was initiated by the subscribing clients 25. The server 33 may utilize the earlier of the two modification operations, the latter of the two modification operations, or the modification operation closest to a particular time, to name a few. The system 21 may also or alternatively notify a client 25 if her modifications have gone unused due to a conflict resolution, so that the client is aware that such changes will not be utilized.

Figure 4:
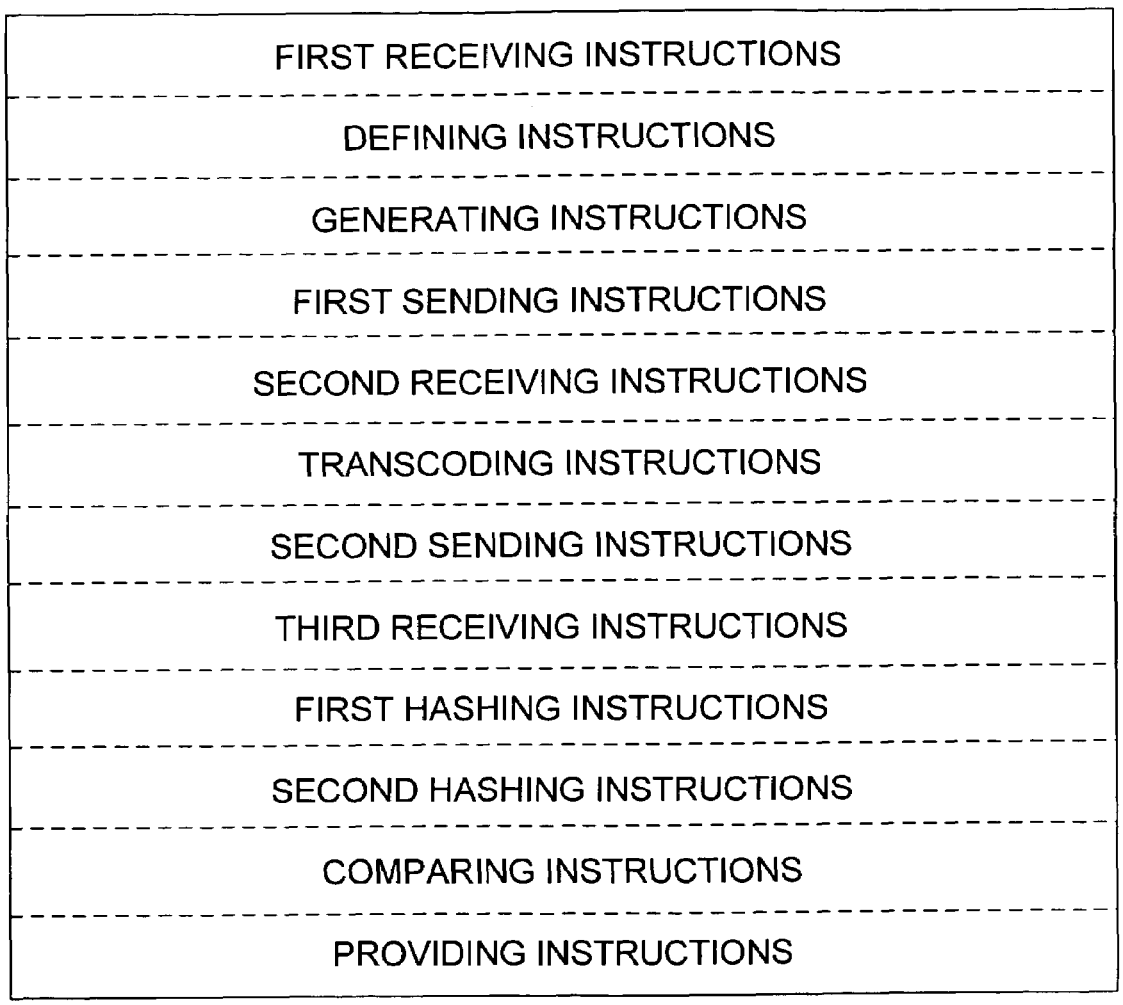
FIG. 4 is a diagram of a computer-readable medium (CRM) of the present invention.

In another example, the server 33 receives at least one operation from a Client 1 and a Client 2 and sends the operations of one client (e.g., Client 1) to the other client (e.g., Client 2). With his own operations in hand and the operations of Client 1 send from the server, Client 2 may then review each of the proposed changes side-by-side to determine what operations, if any, of both sets of operations should be adopted. In this manner, one of the clients 25 performs the role of conflict resolution. As would be readily understood by one skilled in the art, any number of different conflict resolution schemes may be utilized without departing from the scope of the claimed invention Computer-Readable Medium for Synchronizing Documents with Multiple Client FIG. 4 is a diagram of a computer-readable medium (CRM) of the present invention, generally indicated 125. The computer-readable medium has computer-executable instructions for synchronizing documents with multiple clients. The computer-executable instructions for performing steps comprise receiving instructions for receiving instructions from one or more clients regarding a format in which each of the one or more clients wishes to receive data. The computer-executable instructions further comprise defining instructions for defining subsections of an original document, the original document being of potential interest to one or more of the clients, the subsections corresponding to semantic breaks within the original document. The computer-executable instructions further comprise generating instructions for generating a subsection ID identifying each of the subsections and sending instructions for sending a listing of the subsection IDs to the one or more clients. The computer-executable instructions further comprise receiving instructions for receiving a request from at least one of the one or more clients to subscribe to one or more of the subsections. The computer-executable instructions further comprise transcoding instructions for transcoding, responsive to the request, the one or more of the subsections of the original document to which one or more clients wishes to subscribe into the format in which the respective one or more clients wishes to receive data. The computer-executable instructions further comprise sending instructions for sending the transcoded, subscribed subsections to the one or more clients according to their respective subscription requests.

In another example, also depicted in FIG. 4, the computer-executable instructions further comprise receiving instructions for receiving at least one operation from one of the subscribing clients to modify a subscribed subsection of the original document. The computer-executable instructions further comprise hashing instructions for hashing the one or more of the subsections of the original document to which one or more clients subscribes into a numerical value indicative of the contents of the original document and hashing instructions for hashing the modified subsection of the original document into a numerical value indicative of the content of the at least one modified subsection. The computer-executable instructions further comprise comparing instructions for comparing the numerical value of the subsection of the original document to the numerical value of the modified subsection to determine if the subsection of the original document has been modified. The computer-executable instructions further comprise providing instructions for providing the at least one operation associated with the subsection to clients subscribing to the subsection for use in modifying the subsection for the client.

EXAMPLE

The following example demonstrates an exemplary synchronization algorithm of the present invention. As discussed generally above, the client 25 begins by specifying to the server 33 the format of the data that it wishes to receives (e.g., the server document 61 may stored in a Microsoft Word Document format, whereas the device only understands basic HTML). Here is an exemplary client request:

```
<Sync>
    <ContentType>BasicHtml</ContentType>
</Sync>
```

After defining five subsections 65 of the original document 61 in this example and generating unique subsection IDs (e.g., Part1, Part2, etc.) identifying each of the subsections, the server 33 responds by sending at 41 the listing of subsection IDs to the client 25 after which the client can "subscribe" to a particular subsection of the document. An exemplary server response would be:

```
<Sync>
    <SubSection>
        <Id>Part1</Id>
        <Title>
```

This is part 1's section title transcoded into HTML format

```
        </Title>
    </SubSection>
    <SubSection>
        <Id>Part2</Id>
        <Title>
```

This is part 2's section title transcoded into HTML format

```
        </Title>
    <SubSection>
        <Id>Part3</Id>
        <Title>
```

```
        </Title>
    </SubSection>
    <SubSection>
        <Id>Part4</Id>
        <Title>
```
This is part 4's section title transcoded into HTML format

```
        </Title>
    <SubSection>
        <Id>Part5</Id>
        <Title>
```
This is part 5's section title transcoded into HTML format

```
        </Title>
    </SubSection>
</Sync>
```

After displaying the subsection IDs to the client 25, the client then sends a request to the server 33 specifying the subsections 65 to which the client would like to subscribe. The subsection 65 is identified by the subsection ID in the following example of such a request:

```
<Subscribe>
    <SubSection>Part1</SubSection>
    <SubSection>Part3</SubSection>
</Subscribe>
```

The server 33 determines the set of subsection additions, changes, and deletes that it sends to the respective client 25. To determine deletes, the server 33 notices that a particular subsection 65 has disappeared from the document 61. To determine changes, the server 33 notices that the hash of the content has changed for a subsection 65 to which the client 25 already subscribes. To determine adds, the server 33 notices that either a new subsection 65 was introduced into the document 61 or the client 25 has subscribed to a subsection that it was subscribing to before. The response at 41 by the server 33 will include additions, changes, and deletes for individual client subsections. The changes sent at 41 to the client 25 will only contain subsection 65 content if the client has subscribed to this subsection. Otherwise, the client 25 will be notified of the change, and in some examples, basic subsection ID changes. The following is an example of a typical server 33 response:

```
<Sync>
    <Change>
        <Id>Part1</Id>
        <Data>
```

This is the data in part one of the document. Notice that the subsection ID was not sent. The server sends this data because the client has subscribed to part 1 of the document.

```
        </Data>
    </Change>
    <Change>
        <Id>Part3</Id>
        <Data>
```

Notice that the server did not send part 2 because there was no change.

```
        </Data>
    </Change>
    <Change>
        <Id>Part4</Id>
        <Title>
```

The title of Part 4 changed. Notice that the server sent the title even though the client does not subscribe to part 4. This allows the client to intelligently decide to begin subscribing to part 4 if necessary.

```
        </Title>
    </Change>
    <Delete>
        <Id>Part5</Id>
    </Delete>
    <Add>
        <Id>Part6</Id>
        <Title>
```

A new subsection (part 6) was introduced to the document. The client may choose to subscribe to it in a subsequent synchronization.

```
        </Title>
    </Add>
</Sync>
```

Notice that each subsection 65 contains a transcoded view of the subsection, not the original subsection itself. This allows the server 33 to tailor the provided subsection content to the particular constraints of the device (e.g., the device only supports viewing basic HTML and can only store a single subsection at a time).

General Purpose Computing Device

Figure 5:
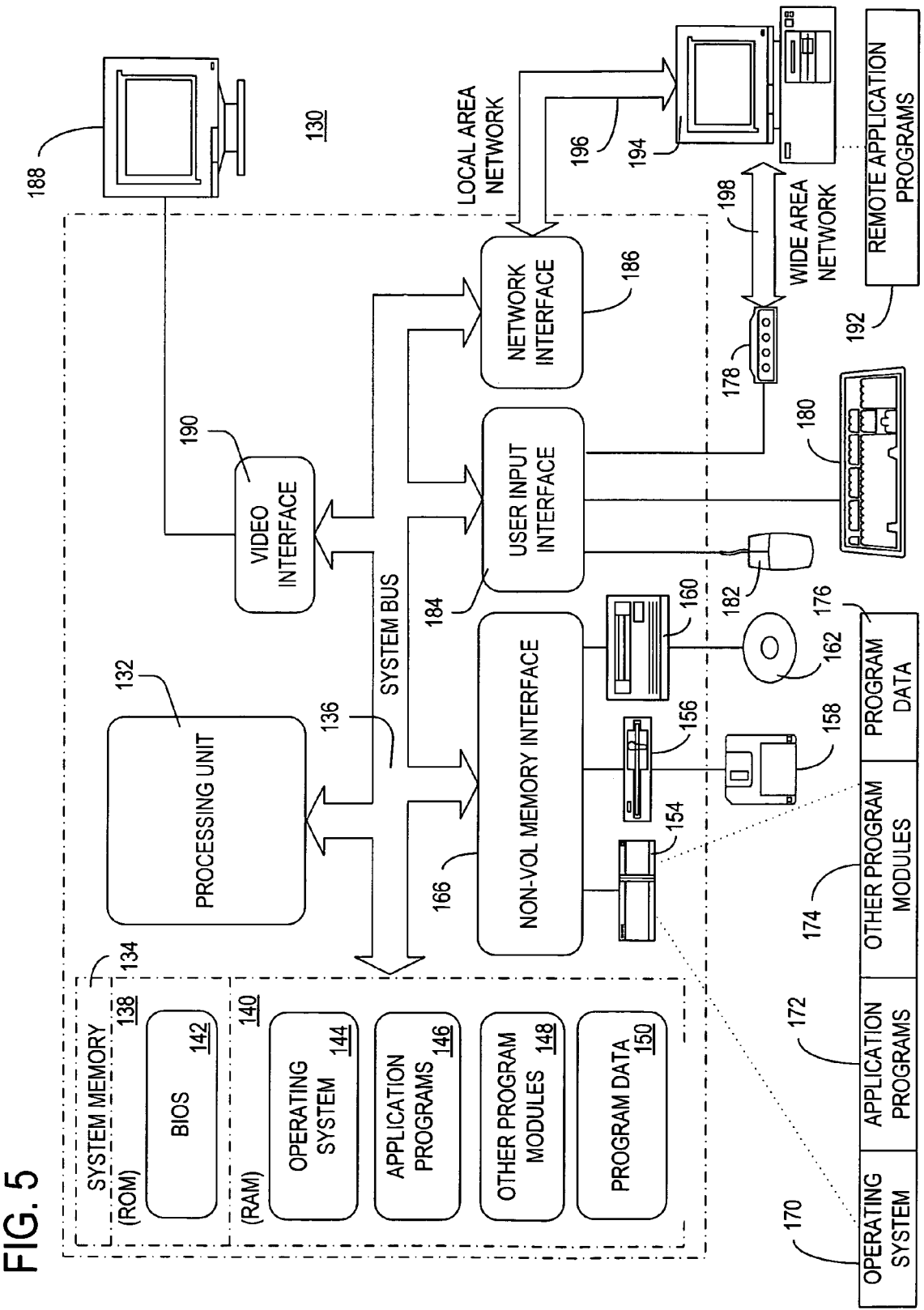
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. In one example, the client computer or device discussed above may be embodied by computer 130. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. In one example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, in one example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer 130 acting as the server 33 executes a method such as described above for synchronizing documents with multiple clients. The computer 130 or its components receiving instructions from one or more clients regarding a format in which each of the one or more clients wishes to receive data. The computer 130 or its components defining subsections of an original document, the original document being of potential interest to one or more of the clients, the subsections corresponding to semantic breaks within the original document. The computer 130 or its components generating a subsection ID identifying each of the subsections. The computer 130 or its components sending a listing of the subsection IDs to the one or more clients. The computer 130 or its components receiving a request from at least one of the one or more clients to subscribe to one or more of the subsections. The computer 130 or its components transcoding, responsive to the request, the one or more of the subsections of the original document to which one or more clients wishes to subscribe into the format in which the respective one or more clients wishes to receive data. The computer 130 or its components sending the transcoded, subscribed subsections to the one or more clients according to their respective subscription requests.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for synchronizing documents with multiple clients, said method comprising:
    receiving instructions from one or more clients regarding a format in which each of said one or more clients receives data;
    defining subsections of an original document, said subsections corresponding to semantic breaks within the original document;
    generating a subsection ID identifying each of said subsections;
    sending a listing of the subsection IDs to said one or more clients;
    receiving a request from at least one of said one or more clients to subscribe to one or more of the subsections;
    transcoding, responsive to said request, said one or more of the subsections of the original document to which said at least one of said one or more clients subscribes into the format in which the respective client receives data;
    sending the transcoded, subscribed subsections to said at least one of said one or more clients according to the respective subscription requests of the clients;
    receiving at least one operation from one of said subscribing clients to modify a subscribed subsection of the original document;
    hashing said one or more of the subsections of the original document to which one or more clients subscribes into a numerical value indicative of the contents of the original document;
    hashing said modified subsection of the original document into a numerical value indicative of the content of the at least one modified subsection;
    comparing the numerical value indicative of the content of the original document to the numerical value indicative of the content of the modified subsection; and
    providing the at least one operation to the clients subscribing to the subsection for use in modifying the subscribed subsection as a function of said comparing.

2. The method of claim 1 further comprising removing the formatting attributes of the one or more subsections before said hashing said one or more of the subsections of the original document and said hashing said modified subsection of the original document.

3. The method of claim 1 wherein said receiving at least one operation from one of said subscribing clients comprises at least one of receiving at least one operation for modifying contents of the subsection, receiving at least one operation for adding contents to the subsection, and receiving at least one operation for removing contents from the subsection.

4. The method of claim 3 further comprising sending an updated listing of the subsection IDs to all clients when said at least one operation adds content to a subsection; and
    sending the at least one operation from one of said subscribing clients to subscribing clients when said at least one operation modifies or deletes content of said subsection.

5. The method of claim 1 further comprising receiving at least one operation from another of said subscribing clients to modify said subscribed subsection; and
    resolving any conflict between the at least one operation received from the one of said subscribing clients and the at least one operation received from the another of said subscribing clients to modify the same subscribed subsection.

6. The method of claim 5 wherein said resolving any conflict comprises applying a modification authority hierarchy to determine whether to apply the at least one operation from said one of said subscribing clients or the another of said subscribing clients based upon the position of each subscribing client in the hierarchy.

7. The method of claim 5 wherein said resolving any conflict comprises utilizing the at least one operation that satisfies a temporal requirement based upon the time each of said at least one operations was initiated by said subscribing clients.

8. The method of claim 1 wherein said defining the subsections of the original document comprises separating the document into the subsections based upon a table of contents associated with the document identifying logical breaks within the document.

9. The method of claim 8 wherein said defining the subsections of the original document further comprises generating said table of contents based upon the inherent structure of the document.

10. The method of claim 8 wherein said defining the subsections of the original document further comprises utilizing a client-defined table of contents.

11. The method of claim 1 wherein said generating a subsection ID identifying each of the subsections comprises linking the name of the subsection and the location of the subsection within the document together to generate each subsection ID.

12. The method of claim 1 further comprising providing a sample portion of a subsection to a non-subscribing client for reviewing the sample portion of the contents of the subsection; and
providing a selection element to said non-subscribing client for electing to subscribe or not to subscribe to said sampled subsection.

13. The method of claim 12 further comprising providing a selection element to said non-subscribing client for requesting said sample portion.

14. The method of claim 12 wherein said providing a sample portion of a subsection further comprises providing a sample portion sized for download and storage to the device of the non-subscribing client based upon the capabilities of at least one of the network and the device.

15. The method of claim 1 further comprising providing a user interface with at least one selection element allowing the client to subscribe or unsubscribe to subsections of said document.

16. A system for synchronizing documents with multiple clients connected with said system via a network, said system comprising:
a server connected to said network for receiving instructions from one or mote of said clients regarding the format in which each of said one or more clients receives data from the server via the network; and
a database connected with the server for storing an original document, wherein said server is further configured to:
define subsections of said original document stored on said database, said subsections corresponding to semantic breaks within the original document;
generate a subsection ID identifying each of said subsections;
send a listing of the subsection IDs to each of said one or more clients via said network;
receive a request from at least one of said one or more clients to subscribe to one or more of the subsections via said network;

transcode, in response to said received request, said one or more of the subsections of the original document to which said at least one of said one or more clients subscribes;
send the transcoded subscribed subsections to said at least one of said one or more clients according to the respective subscription requests of the clients;
receive at least one operation from one of said subscribing clients to modify a subscribed subsection of the original document;
hash said one or more of the subsections of the original document to which one or more clients subscribes into a numerical value indicative of the contents of the original document;
hash said modified subsection of the original document into a numerical value indicative of the content of the at least one modified subsection;
compare the numerical value indicative of the content of the original document to the numerical value indicative of the content of the modified subsection; and
provide the at least one operation to the clients subscribing to the subsection for use in modifying the subscribed subsection as a function of the comparison.

17. A computer-readable medium having computer-executable instructions for synchronizing documents with multiple clients, said computer-executable instructions for performing steps comprising:
receiving instructions from one or more clients regarding a format in which each of said one or more clients receives data;
defining subsections of an original document, said subsections corresponding to semantic breaks within the original document;
generating a subsection ID identifying each of said subsections;
sending a listing of the subsection IDs to said one or mote clients;
receiving a request from at least one of said one or more clients to subscribe to one or more of the subsections;
transcoding, responsive to said request, said one or more of the subsections of the original document to which said at least one of said one or more clients subscribes into the format in which the respective client receives data;
sending the transcoded, subscribed subsections to said at least one of said one or more clients according to the respective subscription requests of the clients;
receiving at least one operation from one of said subscribing clients to modify a subscribed subsection of the original document;
hashing said one or more of the subsections of the original document to which one or more clients subscribes into a numerical value indicative of the contents of the original document;
hashing said modified subsection of the original document into a numerical value indicative of the content of the at least one modified subsection;
comparing the numerical value indicative of the content of the original document to the numerical value indicative of the content of the modified subsection; and
providing the at least one operation to the clients subscribing to the subsection for use in modifying the subscribed subsection as a function of said comparing.

* * * * *